UNITED STATES PATENT OFFICE.

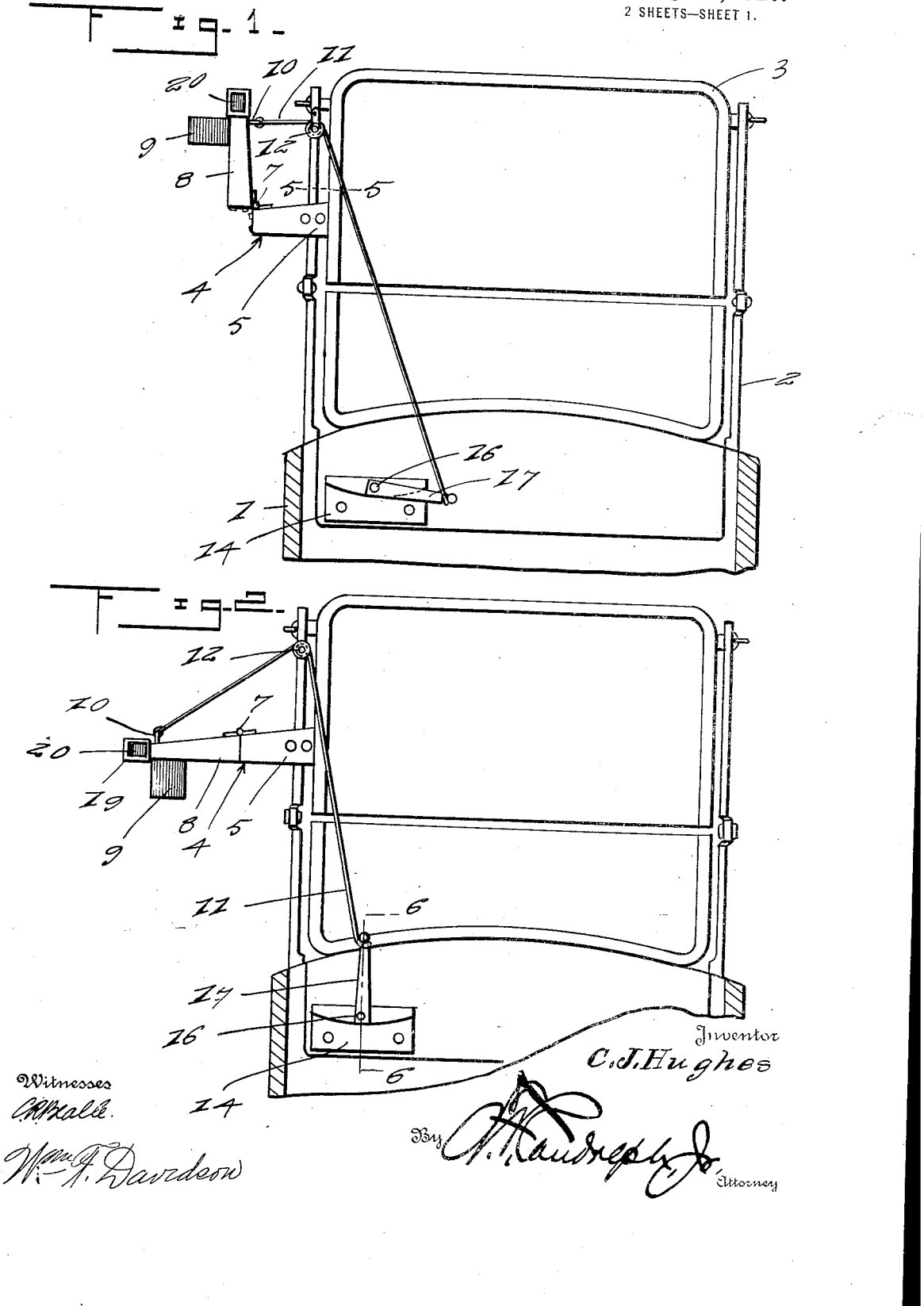

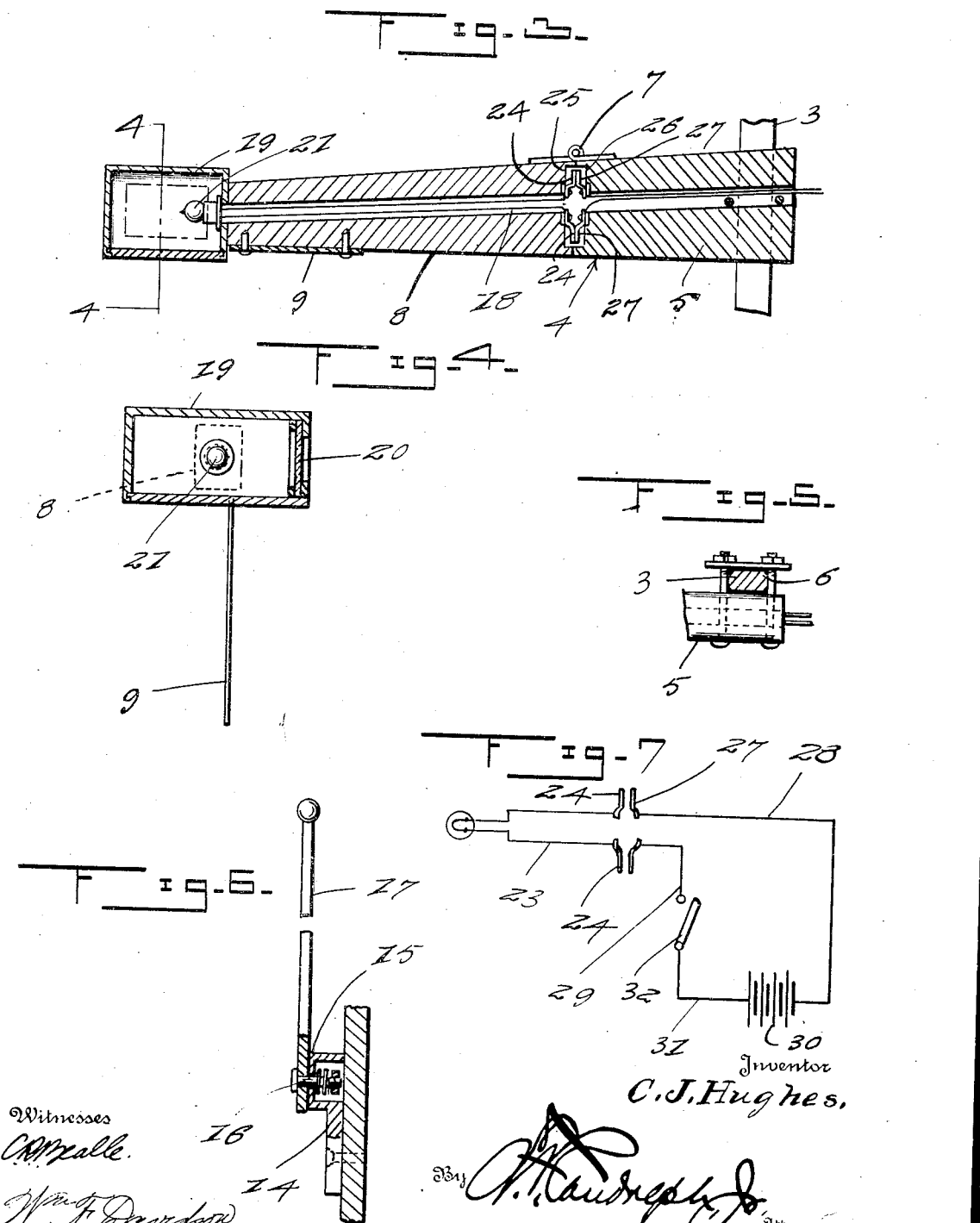

CHARLES J. HUGHES, OF SUMMERVILLE, SOUTH CAROLINA.

AUTOMOBILE-SIGNAL.

1,350,998.  Specification of Letters Patent.  Patented Aug. 24, 1920.

Application filed February 28, 1917. Serial No. 151,491.

*To all whom it may concern:*

Be it known that I, CHARLES J. HUGHES, a citizen of the United States, residing at Summerville, in the county of Dorchester and State of South Carolina, have invented certain new and useful Improvements in Automobile-Signals; and I do hereby declare the following to be a full, clear, and exact description of the invention, such as will enable others skilled in the art to which it appertains to make and use the same.

This invention relates to an automobile signal and has for one of its objects, the provision of a device of this character, whereby the operator of the automobile may readily notify the traffic in front and rear of the automobile when a stop is to be made without the necessity of projecting the arm from one side of the automobile as now customary, to notify the traffic when a stop is to be made.

Another object of this invention is the provision of an arm secured to the automobile and comprising a pair of sections being hinged together and one section adapted to normally maintain a vertical position when in a non-signaling position, and which may swing to a horizontal position to indicate to the traffic in front and rear of the automobile when a stop is contemplated.

A further object of this invention is the provision of a signal plate secured to a movable section of the arm adapted to attract attention to the movements of the movable section.

A still further object of this invention is the provision of an automobile signal of the above stated character, which shall be simple, durable and efficient, and which may be manufactured and sold at a comparatively low cost.

With these and other objects in view, as will become more apparent as the description proceeds, the invention consists of certain novel features of construction, combination and arrangement of parts as will be hereinafter more fully described and claimed.

For a complete understanding of my invention, reference is to be had to the following description and accompanying drawing, in which:

Figure 1 is a rear elevation of an automobile signal constructed in accordance with my invention, Fig. 2 is a similar view illustrating the signal arm in a signaling position, Fig. 3 is a longitudinal sectional view of the arm, Fig. 4 is a detail sectional view taken on the line 4—4 of Fig. 3, Fig. 5 is a detail sectional view taken on the line 5—5 of Fig. 1, illustrating the connection of the arm to an automobile, Fig. 6 is a detail sectional view illustrating the pivotal connection of the operating lever to the automobile, Fig. 7 is a diagrammatical view of the wiring diagram.

Referring in detail to the drawings, the numeral 1 indicates a portion of an automobile body having vertical uprights 2, thereon, to which is connected the ordinary windshield 3. The foregoing description relates to a well known construction of automobile and to which my invention is applied.

A signaling arm 4 has one end enlarged as shown at 5 and secured to one of the vertical uprights 2 of the windshield 3 by a clamp 6. The signaling arm 4 comprises a pair of sections hinged together as illustrated at 7 forming a movable signaling section 8.

A signaling plate 9 is secured to the movable section 8 of the signaling arm 4 adjacent its free end and is adapted to be coated any desired color, and secured to the free end of the movable section 8 is an eyebolt 10 to which a cord or cable 11 is secured. The cord or cable 11 passes over a pulley 12 journaled to one of the vertical uprights 2.

A plate 14 is secured to the body 1 of the automobile and has an offset portion 15 in which is mounted a spring pressed bolt 16. Secured to the spring pressed bolt 16 is an operating lever 17 having the free end of the cord or cable connected adjacent its free end, whereby upon swinging the operating lever 17 into a vertical position as shown in Fig. 2, the movable section 8 of the signaling arm will be swung into a horizontal or signaling position as shown in Fig. 2, indicating that a stop is to be made. By swinging the operating lever 17 to a substantially horizontal position, as shown in Fig. 1, the movable section 8 of the signaling arm 4 is supported in a vertical position or a non-signaling position.

The signaling arm 4 has a central bore 18 extending throughout its length, which is in communication with an opening in a casing 19, which is secured to the free end of the movable section 8, as shown in Fig. 3. One end of the casing 19 is closed by a colored glass plate 20. Seated within the opening of the casing, which is in communication with the bore 18 of the signaling arm is an electric lamp 21, which has connected thereto conductors 23, which extend through the bore 18 of the movable section 8 and are connected to contacts 24 located in a recess 25 of the hinged end of the movable section 8. A recess 26 is formed within the outer end of the stationary section of the signaling arm 4 and has secured therein contacts 27 which are connected to conductors 28 and 29. The conductors 28 and 29 extend through the bore 18 of the stationary section of the signaling arm and the conductor 28 is connected to a storage battery 30 or other suitable electric source which may be used for illuminating the automobile on which the device is applied.

A conductor 31 is connected to the storage battery 30 and to a switch 32, which is adapted to be located within the automobile at any convenient point whereby the operator may readily open and close the same. The conductor 29 is connected to the switch 32, whereby upon closing the switch 32, an electric circuit will be completed to the electric lamp 21, providing that the movable section is in a signaling position or a horizontal position, thus rendering the device operative at night time.

When the movable section 8 is in a vertical position, or a non-signaling position, the contacts 25 and 26 are disengaged from each other breaking the electric circuit to the electric lamp 21, but upon swinging the movable section 8 into a horizontal position, or a signaling position, the contacts 25 and 26 engage each other, completing an electric circuit to the electric lamp 21, illuminating the casing 19.

While I have shown and described the preferred embodiment of my invention, it will be understood that minor changes in construction, combination and arrangement of parts may be made without departing from the spirit and scope of the invention as claimed.

What is claimed is:

An automobile signal comprising an arm of substantially rectangular shape in cross section and gradually tapering from one end in the direction of its other end and having its largest end secured to an automobile, said arm including movable and non-movable sections and said movable section being of a greater length than the non-movable section, a hinge secured to the upper faces of said sections so that said sections may have end abutting engagement with each other when in one position and to allow said movable section to be disposed vertically and at right angles to the non-movable section when in another position, a signal secured to the movable section, and an operating means connected to the movable section.

In testimony whereof I affix my signature in presence of two witnesses.

CHARLES J. HUGHES.

Witnesses:
W. H. HARRIS,
W. GROOMS.